United States Patent
Manning

(10) Patent No.: US 9,631,757 B2
(45) Date of Patent: Apr. 25, 2017

(54) PIPE JOINT

(75) Inventor: John Manning, Norwich (GB)

(73) Assignee: Acorn Intellectual Properties Limited (JE)

( * ) Notice: Subject to any disclaimer, the term of this patent is extended or adjusted under 35 U.S.C. 154(b) by 0 days.

(21) Appl. No.: 13/125,162

(22) PCT Filed: Oct. 20, 2009

(86) PCT No.: PCT/GB2009/002483
§ 371 (c)(1),
(2), (4) Date: Jul. 5, 2011

(87) PCT Pub. No.: WO2010/046627
PCT Pub. Date: Apr. 29, 2010

(65) Prior Publication Data
US 2011/0254262 A1    Oct. 20, 2011

(30) Foreign Application Priority Data
Oct. 20, 2008 (GB) .................................. 0819176.9

(51) Int. Cl.
*F16L 37/12* (2006.01)
*F16L 37/14* (2006.01)
*F16L 19/02* (2006.01)
*F16L 21/08* (2006.01)

(52) U.S. Cl.
CPC ......... *F16L 37/148* (2013.01); *F16L 19/0231* (2013.01); *F16L 21/08* (2013.01)

(58) Field of Classification Search
CPC ...... F16L 19/0231; F16L 21/08; F16L 37/148
USPC ............................ 285/91, 321, 403, 404, 305
See application file for complete search history.

(56) References Cited

U.S. PATENT DOCUMENTS

| | | | | |
|---|---|---|---|---|
| 2,299,643 A | * | 10/1942 | Moody | 251/149.1 |
| 2,458,714 A | | 1/1949 | Mahoney | |
| 3,334,929 A | * | 8/1967 | Wiltse | 285/305 |
| 3,606,402 A | * | 9/1971 | Medney | 285/305 |

(Continued)

FOREIGN PATENT DOCUMENTS

| | | |
|---|---|---|
| EP | 0 340 499 | 11/1989 |
| EP | 0 438 296 A2 | 7/1992 |

(Continued)

OTHER PUBLICATIONS

Search Report for corresponding Patent Application No. GB 0819176.9 dated Feb. 18, 2009.

*Primary Examiner* — Gregory Binda
(74) *Attorney, Agent, or Firm* — Renner, Otto, Boiselle & Sklar, LLP

(57) ABSTRACT

Provided is a pipe joint for connecting tubular conduits, in particular for connecting lengths of pipe to form a fluid transport system. The pipe joint includes a conduit formed with at least one connection end. The or each connection end includes a wall defining a receiving recess for receiving an end of a pipe length; a groove formed to a depth in an internal surface of the wall of the receiving recess; and a channel communicating between the groove and an external surface of the connection end. The pipe joint further includes a connector formed from a length of material which is seatable within the groove via the channel and which is wider than the depth of the groove so that when seated within the groove the connector extends into the receiving recess.

15 Claims, 9 Drawing Sheets

(56) References Cited

U.S. PATENT DOCUMENTS

| | | | | |
|---|---|---|---|---|
| 3,759,553 | A * | 9/1973 | Carter | 285/260 |
| 4,052,091 | A | 10/1977 | Bowden | |
| 4,427,221 | A | 1/1984 | Shay | |
| 4,498,874 | A * | 2/1985 | Pichl | 440/83 |
| 4,518,177 | A | 5/1985 | Deakins | |
| 5,165,832 | A * | 11/1992 | Dimov | 411/300 |
| 6,343,813 | B1 * | 2/2002 | Olson et al. | 285/305 |
| 6,352,288 | B1 * | 3/2002 | Calkins | 285/305 |
| 6,739,630 | B2 * | 5/2004 | Riedy | 285/321 |

FOREIGN PATENT DOCUMENTS

| | | |
|---|---|---|
| GB | 1 266 535 A | 3/1972 |
| GB | 2 404 956 A | 2/2005 |

* cited by examiner

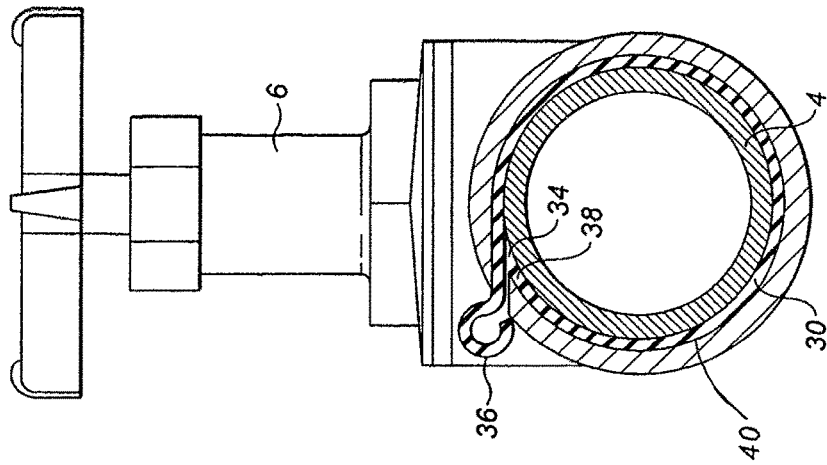
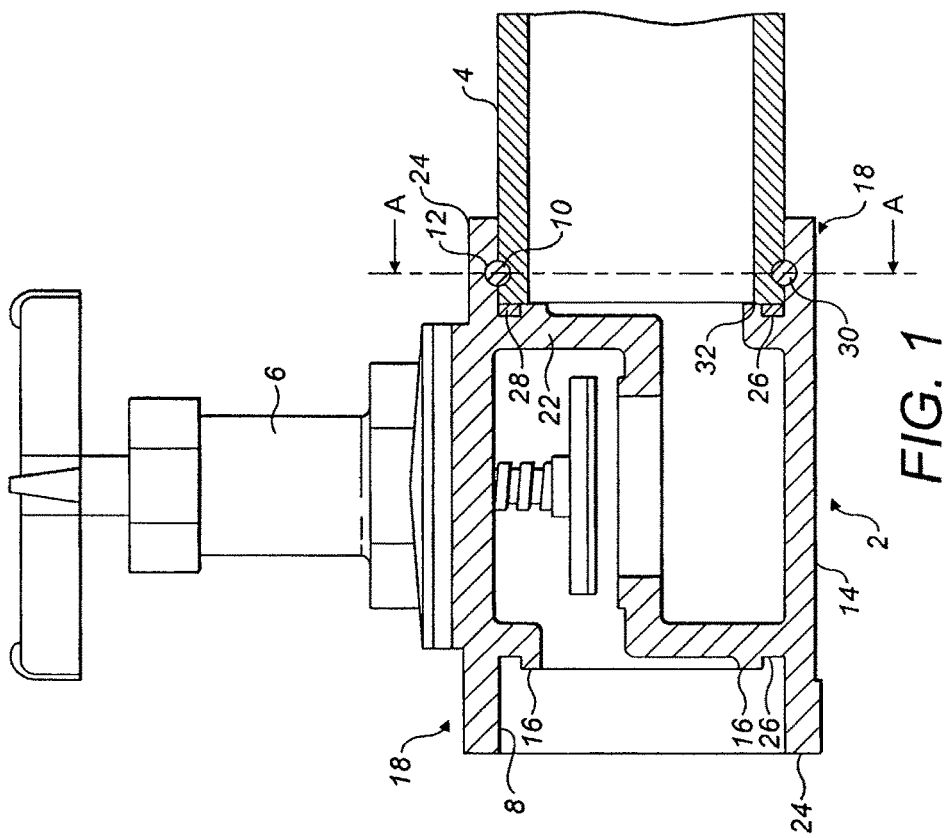
FIG. 1
FIG. 2

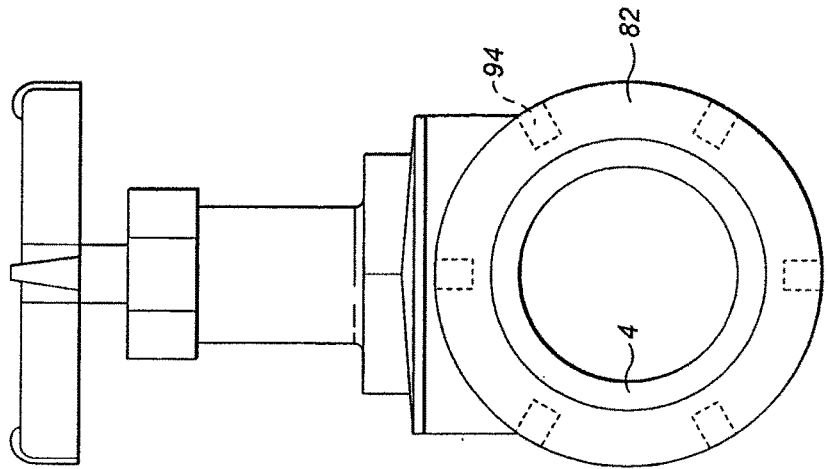
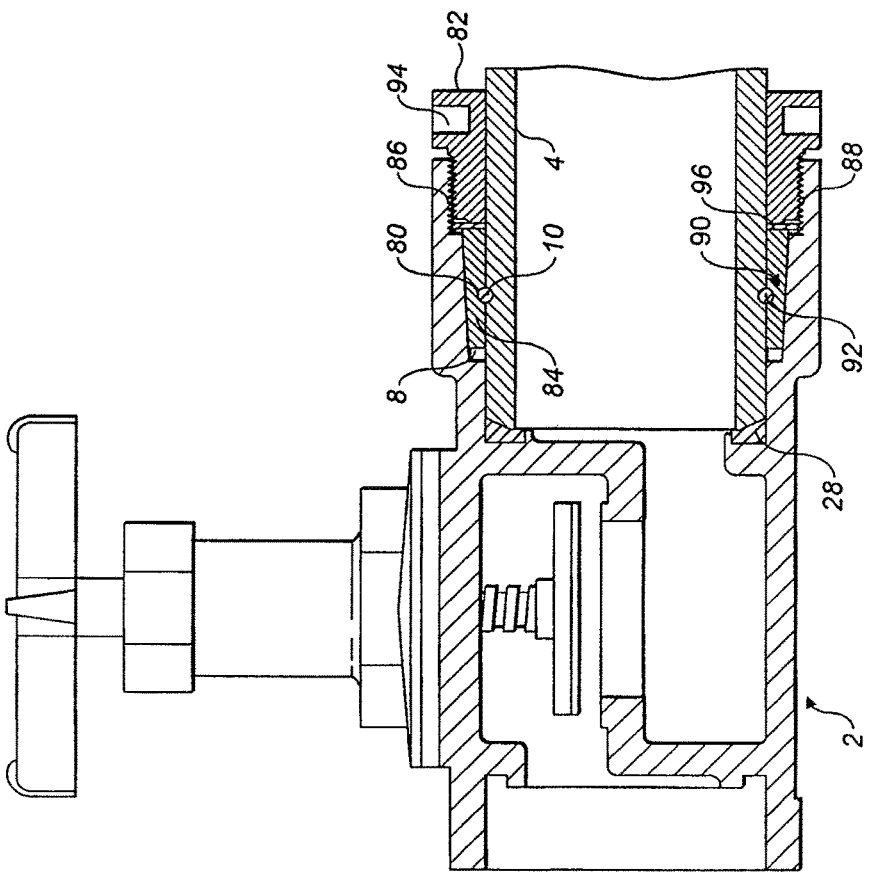

PIPE JOINT

FIELD OF THE INVENTION

The present invention relates to a joint for connecting tubular conduits, in particular for connecting lengths of pipe to form a fluid transport system.

BACKGROUND OF THE INVENTION

Fluid transport systems are known for conveying materials, such as liquids and gasses, with common examples including water and fuels such as gas and oil. The systems may include oil and gas pipelines for conveying fuel over thousands of miles. The tubular conduits used in fluid transport of fuel may be made of different metals, including steel, iron, copper, aluminium and plastic.

For small bore plastic pipes a press or screw fit joint can be used, and in copper pipe, the use of soft solder is the usual means of joint connection.

For larger diameter pipes, typically 1 to 1.5 meters (around 40 to 60 inches) in diameter, used in the transport of fuel, welded joints are commonly used. However, welded joints have the disadvantage of requiring skilled workers as well as having negative health and safety and environmental implications. For example, construction of gas or oil conveying pipelines, which are typically made from approximately 12 meter (40 feet) long lengths of steel pipe with a diameter of 1 to 1.5 meters (around 40 to 60 inches) and conventionally use welded joints. Each joint can take a skilled team a whole day to make, when taking into consideration, the deployment of equipment at the joint location and inspection of the joint by X-ray equipment. Also, around 1 in 10 of such welded joints will have to be repaired after an inspection. This makes oil and gas pipelines expensive and time consuming to construct and maintain.

A further problem with press fit and welded joints is that they are difficult to disconnect, for example, for repair or maintenance, and once disconnected are not generally re-useable. Furthermore, disconnection of press fit or welded joints often results in damage to the pipe lengths.

SUMMARY OF THE INVENTION

In accordance with one aspect of the present invention, there is provided a pipe joint comprising:
  a conduit formed with at least one connection end wherein the or each connection end comprises:
    a wall defining a receiving recess for receiving an end of a pipe length;
    a groove formed to a depth in an internal surface of the wall of the receiving recess;
    a channel communicating between the groove and an external surface of the connection end, and
    a connector formed from a length of material which is seatable within the groove via the channel and which is wider than the depth of the groove so that when seated within the groove the connector extends into the receiving recess.

A length of pipe to be connected to the pipe joint is formed with a groove on its external surface corresponding to the or each groove in the internal surface of the wall of the or one of the connecting ends. The connector, when seated in the groove in the wall of the end connection, extends into the corresponding groove in the pipe length. In order to provide a stable fixing, which also contributes to the sealing of the pipe length within the pipe joint, the connector may fit snugly between the grooves.

A pipe length may be fitted into the pipe joint by following the steps of: inserting an end of the pipe into the receiving recess; aligning the or each groove in the pipe with the corresponding groove or grooves in the internal wall of the receiving recess; and inserting the or each connector, via the channel, into a spaced formed by the aligned grooves. The or each groove in the pipe may match a corresponding groove in the wall of the receiving recess and a connector may be provided for each set of corresponding grooves.

The fitting of the pipe length into the pipe joint may be carried out by sliding the length of material forming the connector along the space between the corresponding grooves via the channel. The connector straddles the groove in the internal surface of the wall of the receiving recess and the groove in the external surface of the pipe length to fix the pipe length in the pipe joint.

The pipe joint according to the present invention is relatively cheap to make and install. It is also safe to install as it does not require welding. In addition, the fixing can be undone for repair or maintenance from the outside of the pipe joint by simply removing the connector from the grooves via the channel. An engagement means may, for example, be a graspable hook provided at one end of the connector for this purpose.

Fitting the pipe length within the pipe joint may comprise the additional steps of forming the groove in the internal surface of the wall of the or each connecting end and forming the groove in the external surface of the pipe length. Cutting tools are available in the art for cutting such grooves in pipes and pipe joints.

The connector may be formed from a length of resilient material which is able to take up the shape of the groove in the internal surface of the wall of the receiving recess, when the connector is moved via the channel into the groove. For example, the connector may be formed from a length of metal, such as a bar of spring steel or a length of metal wire. In addition, the connector may be covered with a lubricating coating, such as Teflon®, to aid the movement of the connector through the channel and the groove.

There may be one or more groove in the receiving recess, with a corresponding channel and connector for each groove. In this case a corresponding number of grooves may be formed on the external surface of the pipe end. The or each groove in the receiving recess or the pipe length may have a transverse cross-section which matches a segment of a transverse cross-section of the connector; in particular, the segment may be a substantially circular segment.

The grooves in the receiving recess may extend in a substantially circumferential direction along the internal surface of the wall of the receiving recess. Similarly, the grooves in the pipe length may extend in a substantially circumferential direction along the external surface of the pipe length. For example, the grooves may be annular grooves and the connector may extend substantially all the way around the groove. This arrangement provides a fixing between the connecting end and the pipe length which extends all the way around the pipe length, thus providing a high-strength connection. The or each groove in the receiving recess may alternatively extend helically around the internal surface of the wall of the receiving recess. In this case the helical groove may extend at least once around the receiving recess.

The length of material of the connector may have a first end insertable into the channel and a second end, remote from the first end, which second end may be seatable against an external surface of the connection end, for example, when the connector is fully inserted. In order to facilitate insertion of the connector into the groove via the channel, the channel and the groove may merge smoothly.

The conduit may comprise a valve arrangement, but it may also comprise another length of pipe or any other conduit used to connect to one or more pipe lengths.

Typically, the internal surface of the wall of the receiving recess may be substantially cylindrical, in order to receive a standard cylindrical pipe.

The joint may additionally comprise a pipe end face abutment extending inwardly of an internal surface of the conduit. In this case the abutment may be an annular abutment and the abutment may form a seat for an annular seal.

The annular seal may seal between the annular abutment and an end face of the pipe length.

Further features and advantages of the invention will become apparent from the following description of preferred embodiments of the invention, given by way of example only, which is made with reference to the accompanying drawings.

BRIEF DESCRIPTION OF THE DRAWINGS

FIG. 1 shows a partial longitudinal cross-section of a pipe joint incorporating a valve and a length of pipe in accordance with a first embodiment of the present invention;

FIG. 2 shows a partial transverse cross-section through line A-A of FIG. 1;

FIG. 15 shows a partial longitudinal cross-section of a pipe joint in accordance with an eighth embodiment of the present invention; and FIG. 16 shows a partial transverse cross-section of the pipe joint of FIG. 15.

DETAILED DESCRIPTION OF THE INVENTION

Figure 3:
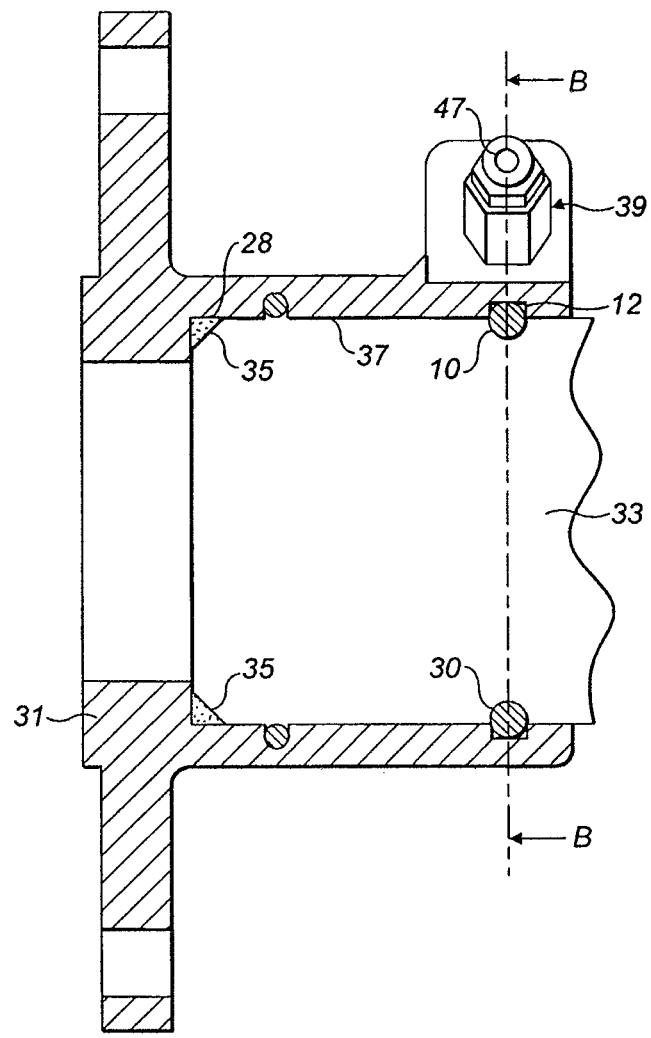
FIG. 3 shows a partial longitudinal cross-section of a pipe joint in accordance with a second embodiment of the present invention.

Like parts are represented by like numerals in each of the Figures.

FIG. 1 shows a partial longitudinal cross-section through a pipe joint 2 connected to a length of pipe 4. Only the end of the pipe length 4 connected to the pipe joint 2 is shown in FIG. 1. The pipe joint 2 comprises a conduit 14 with two open connection ends 18. The conduit 14 incorporates a valve arrangement 6, as is known in the art; however, the conduit 14 need not incorporate a valve arrangement, but may comprise any length or shape of conduit with one or more such open connection ends 18.

Each connection end 18 is formed with a receiving recess 8 shaped to receive an end of a pipe length 4; the receiving recess 8 generally has a substantially circular transverse cross-section. The receiving recess 8 is formed with an end face 24. A substantially circumferential annular groove 12 is formed in the internal surface of the wall of the receiving recess 8, which annular groove 12 has a substantially semi-circular transverse cross-section. The groove 12 may be formed when the pipe joint 2 is formed; alternatively, the groove 12 can be cut into the internal surface of the receiving recess 8 using a cutting tool of the type known in the art for cutting such grooves. The groove 12 communicates with an external surface of the wall of the receiving recess 8 via a channel 34, as shown in FIG. 2. The channel 34 merges smoothly into the groove 12, extending substantially tangentially from the bed of the groove 12. Each receiving recess 8 is terminated at its end remote from the end face 24 by a collar 22, which collar 22 extends radially inwardly from the internal surface of the conduit 14. In FIG. 1, each collar 22 also forms part of the chambers of the valve arrangement 6. The collar 22 is formed with an annular abutment 16 extending from the collar 22 in a direction towards the end face 24, so as to form an annular seal recess 26 in a face of the collar facing towards the end face. The annular seal recess 26 is formed in the face of the collar 22 between the annular abutment 16 and the internal surface of the wall of the receiving recess 8. A resilient annular seal 28 is seated within the seal recess 26.

The pipe length 4 has formed at its end, and is connected to the pipe joint 2 by, a substantially circumferential annular groove 10 on its external surface, which annular groove 10 has a substantially semi-circular cross-section. The groove 10 may be formed when the pipe is formed; alternatively, the groove can be cut into the end of the pipe length 4 using a cutting tool of the type known in the art for cutting such grooves.

The annular groove 12 formed in the receiving recess 8 and the annular groove 10 formed in the pipe length 4, match each other, having substantially identical cross-sections. Also, the annular groove 10 formed in the pipe length 4 may be formed at a predetermined distance from an end face 32 of the pipe length 4, so that when the end face 32 abuts the annular abutment 16 of the receiving recess 8, the annular grooves 10, 12 are aligned. When the grooves 10, 12 are aligned, they form an annular space of substantially circular cross-section. Referring now to FIGS. 1 and 2, a connector, referred to herein as a connection ring 30 is fitted in the annular space formed by the aligned grooves 10, 12 so as to fix the pipe length 4 within the connection end 18 of the pipe joint 2. The connection ring 30 is formed from a length of material, for example a length of metal wire (which may be multi-stranded) or a bar of sprung steel, which material has a substantially circular cross-section. One end of the length of material may be formed into a graspable handle, for example, in the form of a hook 36. With the handle 36 abutting the external surface of the wall of the receiving recess 8, adjacent the channel 34, the length of material is long enough to fill the annular space formed by the annular grooves 10, 12, ie. long enough to extend completely around the groove 10 in the pipe end 4. The cross-section of the connection ring 30 is matched to the cross-section of the space formed by the aligned grooves 10, 12, so that the connection ring 30 fits snugly between the aligned grooves. The connection ring 30 performs the function of locking the pipe end 4 within the receiving recess 8 of the pipe joint 2. This is achieved by providing an interference fit which inhibits separation of the pipe joint 2 when the connection ring 30 is located within the annular space formed by the aligned annular grooves 10, 12.

The connection between the pipe joint 2 and the end of the pipe length 4 is formed as follows. The end of the pipe length 4 is slideably located within the receiving recess 8 of the pipe joint 2 until the end face 32 of the pipe length 4 abuts the abutment 16. This traps the annular seal 28 between the end face 32 of the pipe length 4 and the collar 22 of the conduit 14. The annular seal 28 forms a fluid-tight seal between the pipe length 4 and the conduit 14 of the pipe joint 2. With the end face 32 of the pipe length 4 abutting the abutment 16, the grooves 10, 12 are aligned.

An end 38 of the length of material forming the connection ring 30, which end 38 is remote from the graspable handle 36, is inserted via the channel 34 into the space formed by the grooves 10, 12. The length of material forming the connection ring 30 is pushed around the annular space formed by the grooves 10, 12 until the graspable handle 36 abuts the external surface of the wall of the receiving recess 8 and the connection ring 30 surrounds the pipe end 4. The connection ring 30 can be pushed into the annular space manually or by means of machinery, for example a hydraulic system. The length of material forming the connection ring 30 is flexible and resilient so that it is capable of taking the shape of the annular space formed between the grooves 10, 12 as it is inserted into the channel 34 and pushed around the annular space. The length of material forming the connection ring 30 may also be covered by a lubricating coating 40, such as a coating made from Teflon®. Alternatively or in addition, the connection ring 30 may be lubricated with oil or any other suitable lubricant before it is inserted into the annular space formed between the grooves 10, 12.

It will be appreciated that the lubricant will also serve a sealing purpose. In certain applications the conduit or pipe may not be used as part of a fluid transport system; for example, the conduit could be used an electrical conduit for housing electrical wires. Alternatively, the conduit may be used in the construction industry and may be installed as a structure such as a barrier, handrail, mast or the like. The conduit may be used as a support, for example, as scaffolding, a support beam, rafter or the like. In these applications the joint may not require a seal 28.

Referring now to FIG. 3 there is shown an alternative embodiment of the present invention. The pipe joint 31 is in the form of a flange connector that can be used to join a pipe length 33 to another device (not shown) such as a valve, a T-joint or another flange connector. The end face 35 of the pipe length 33 is provided with a chamfer which can be inserted into a receiving recess 37 of the pipe joint 31 and urged against an annular seal 28. As shown in FIG. 3, the annular seal 28 is not located in a recess and deforms against the chamfered end face 35 to take up a triangular cross-section, and form a fluid-tight seal between the end face 35 of the pipe length 33 and the pipe joint 31. Owing to the three sealing surfaces provided by the deformed annular seal 28, the annular seal 28 is able to withstand higher pressures than that of a standard 'O' ring seal.

Figure 4:
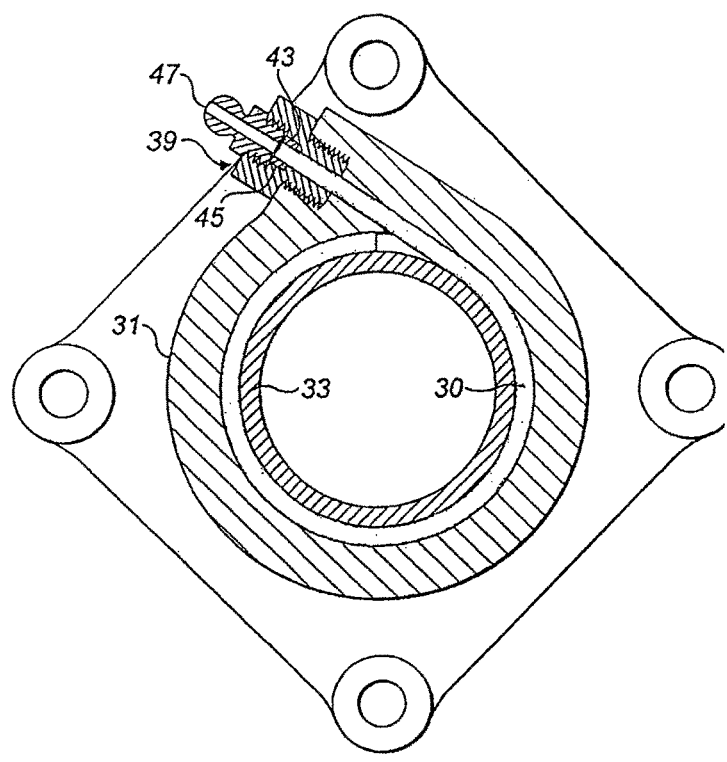
FIG. 4, shows a partial transverse cross-section through line B-B of FIG. 3.
Figure 4A:
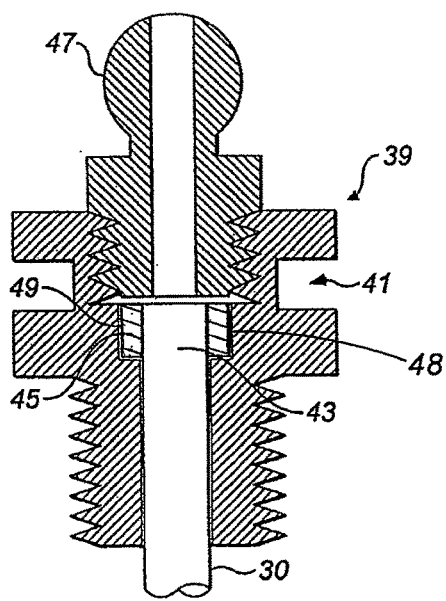
FIG. 4a shows an alternative configuration of part of the pipe joint of FIG. 3.

As shown in FIG. 3 and FIG. 4, the connection ring 30 does not have a handle 36 at its end. Instead, the connection ring 30 has a retainer 39 attached to the connection ring 30 for enabling insertion of the connection ring 30 into the annular space provided by the grooves 10,12 and for allowing extraction of the connection ring 30 from the annular space, when required. The retainer 39 can be screwed to a corresponding threaded portion on the pipe joint 31. When the connection ring 30 is required to be removed from the annular space between the grooves 10, 12 the retainer 39 can be rotated to unscrew it from the pipe joint 31; this rotation acts to initially free or 'waken-up' the connection ring 30, which can be particularly advantageous if the connection ring 30 has been located in the annular space for a long period of time. The retainer 39 is provided with a groove 41 on its periphery; this groove 41 allows a tool (not shown) to engage the retainer 39 to facilitate extraction of the connection ring 30 from the annular space between the grooves 10, 12.

The connection ring 30 is also provided with a ferrule 45 attached to an end 43 thereof to prevent movement of the connection ring further into the annular space between the grooves 10, 12 once it has been inserted therein. The ferrule 45 may be attached to the connection ring 30 by swaging, for example. The ferrule 45 is seated in a recess 49 in the retainer 39 and held therein by a nipple 47; the size of the recess 49 and the arrangement of the nipple 47 are such that the ferrule 45 can freely rotate within the retainer 39. The difference in size between the recess 49 and the ferrule 45 provides a channel 48 therebetween through which a lubricant or sealant, which can be inserted through the nipple 47, can pass to reach the annular space in which the connection ring 30 is located.

The ferrule 45 can be shaped to have a number of flat sides around which a tool (not shown) can be placed to indirectly engage the connection ring 30 and thereby assist with insertion and/or removal of the connection ring 30 into/from the annular space formed by the grooves 10, 12. If the ferrule 45 is provided with six flat sides, so that it has a hexagonal cross-section, for example as shown in FIG. 3, the recess in the retainer 39 should be arranged to be large enough to allow the hexagonal ferrule 45 to rotate in the recess. The recess need not be the same shape as the ferrule 45; for example the ferrule 45 may be a hexagon and the recess 49 circular.

Figure 5:
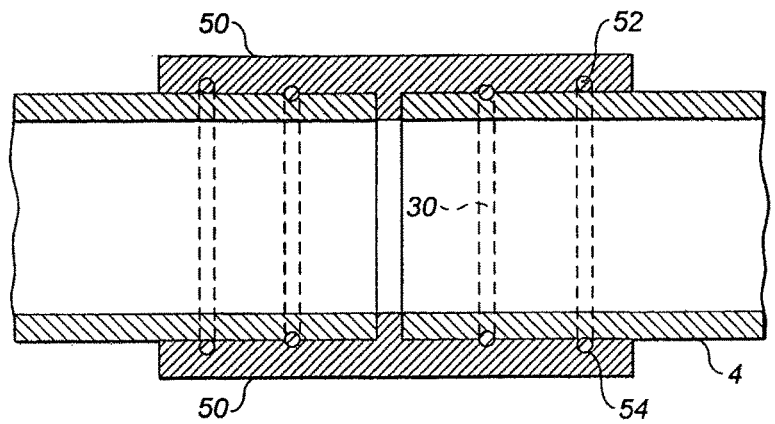
FIG. 5 shows a partial longitudinal cross-section of a pipe joint in accordance with a third embodiment of the present invention.
Figure 6:
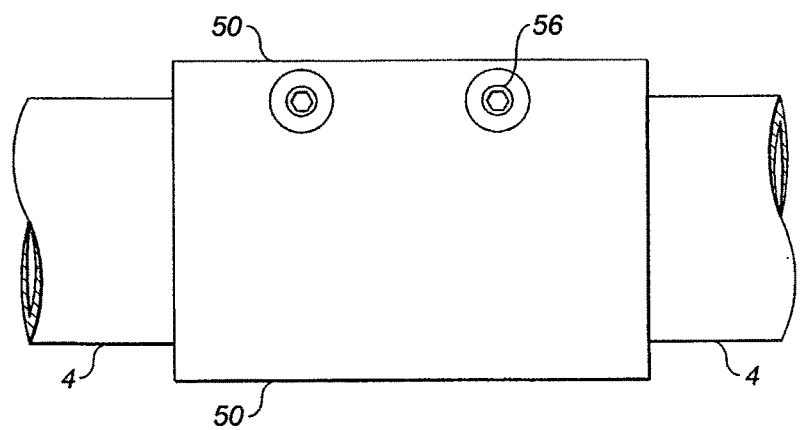
FIG. 6 shows a side view of the pipe joint of FIG. 5.
Figure 7:
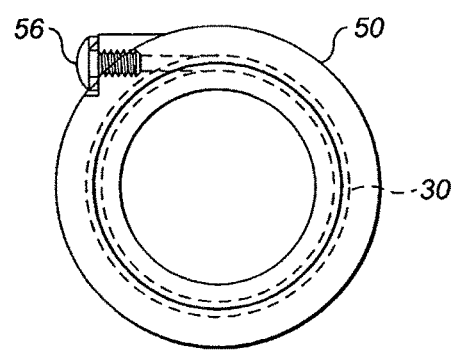
FIG. 7 shows a partial transverse cross-section of the pipe joint of FIG. 5.

Referring now to FIG. 5, there is shown an alternative embodiment of the present invention. FIG. 5 shows a pipe joint in the form of a simple coupler 50 which can be used for joining two lengths of pipe together. The coupler 50 is provided with an annular seal in the form of an O-ring 52 located in an annular groove 54 formed in the internal surface of the walls of the receiving recess 8. Referring also to FIGS. 6 and 7, the connection ring 30 in this embodiment does not include a graspable handle 36. Instead the channel 34 is provided with a bore having a threaded portion for receiving a plug 56 which may be used to prevent ingress of any unwanted matter, for example, rain water, soil, dew or the like, from entering the channel 34. The connection ring 30 may be integral with the plug 56.

Figure 8:
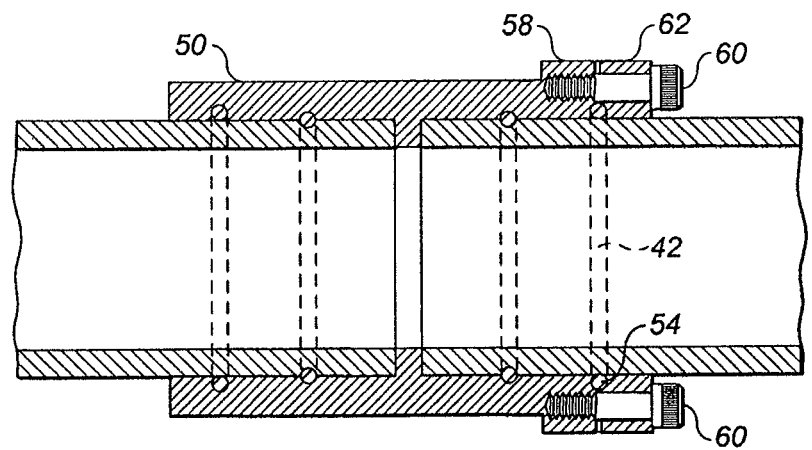
FIG. 8 shows a partial longitudinal cross-section of a pipe joint in accordance with a fourth embodiment of the present invention.
Figure 9:
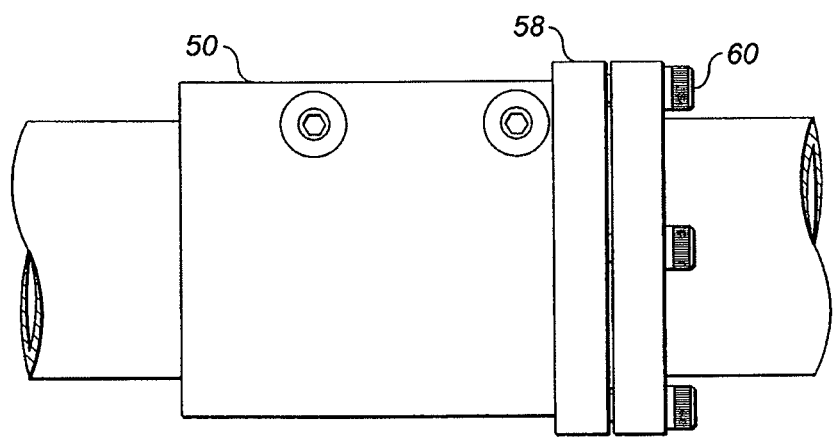
FIG. 9 shows a side view of the pipe joint of FIG. 8.

Referring now to FIGS. 8 and 9, in an alternative embodiment the coupler 50 may be arranged to include a flange 58 at at least one of its ends. The flange 58 may be drilled and tapped to provide a threaded bore. A securing collar 62 which can be slipped over the pipe end 4 may be fastened to the flange 58 by bolts 60 that can be received in the threaded bore of the flange 58. The flange 58 may also be provided with a recess 64 in which a sealing ring 52 can be located to form a seal between the flange 58 and the collar 62.

Figure 11:
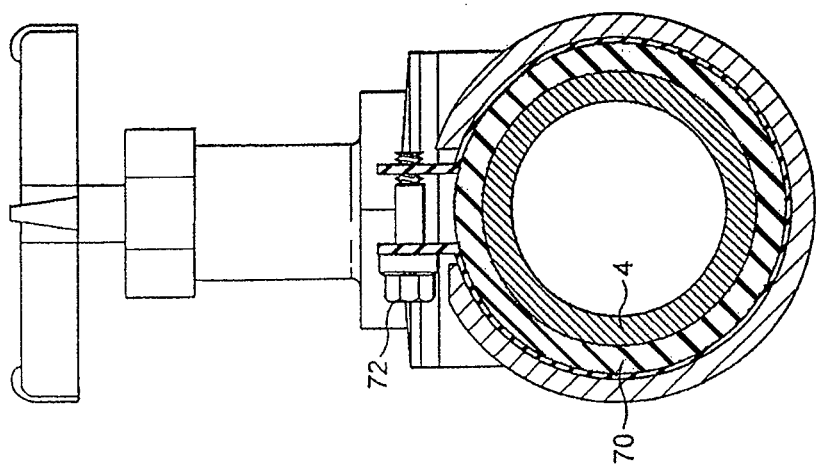
FIG. 11 shows a partial transverse cross-section of the pipe joint of FIG. 10.
Figure 10:
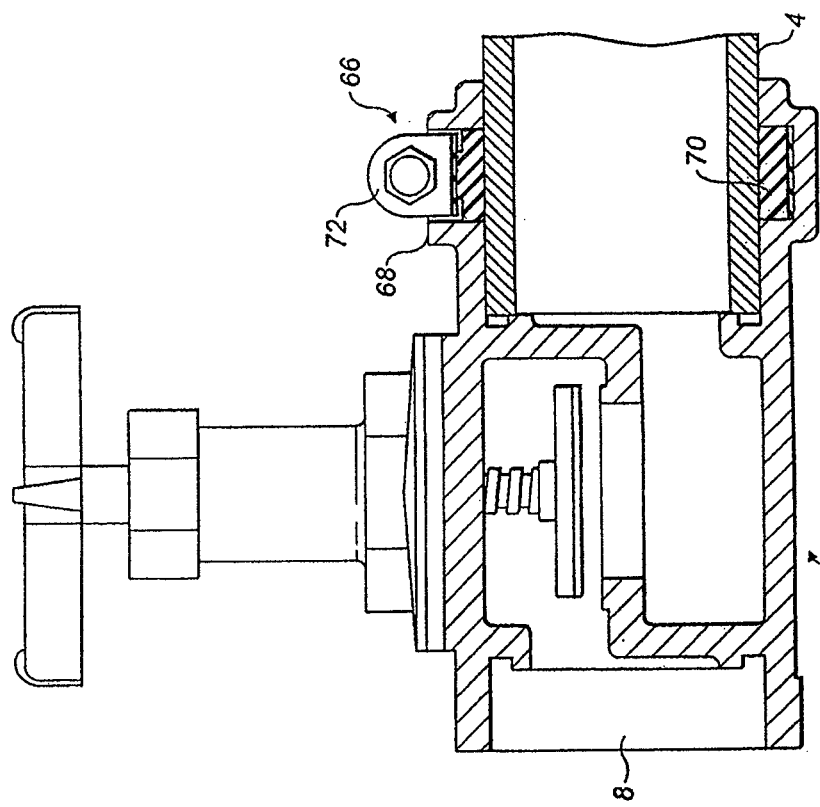
FIG. 10 shows a partial longitudinal cross-section of a pipe joint in accordance with a fifth embodiment of the present invention.

Referring now to FIGS. 10 and 11, in yet a further alternative embodiment of the present invention, there is provided a pipe joint 2 comprising a sealing assembly 66. The sealing assembly 66 includes a boss 68 on the pipe joint 2 in which a seal 70 is located. The seal 70 extends around the outer circumference of the pipe length 4, when the end of the pipe length 4 is positioned within the recess 8. The seal 70 may be tightened and secured onto the pipe length 4 by means of any suitable clamping means 72, such as a band clamp, hose clip or Jubilee clip. The seal 70 may be made of rubber or any other suitable material. The pipe joint 2 is not shown to have a connection ring in the embodiment of FIG. 10. The connection ring 30 can be omitted in applications where the strength of the joint does not have to be particularly high, such as domestic applications. However, it could be re-introduced for high-strength applications.

Figure 13:
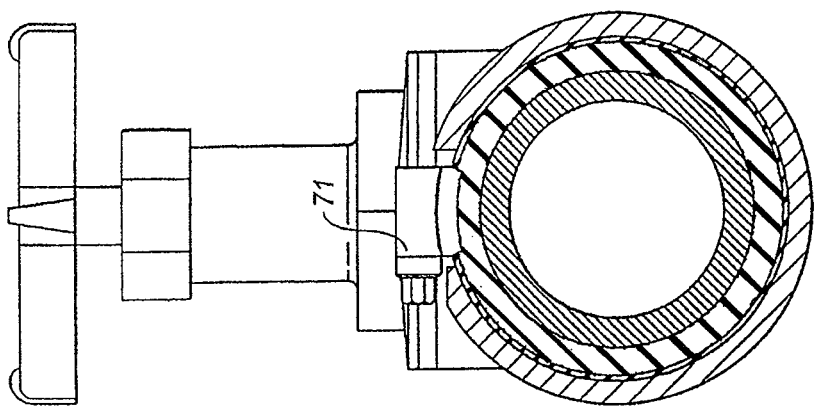
FIG. 13 shows a partial transverse cross-section of the pipe joint of FIG. 12.
Figure 12:
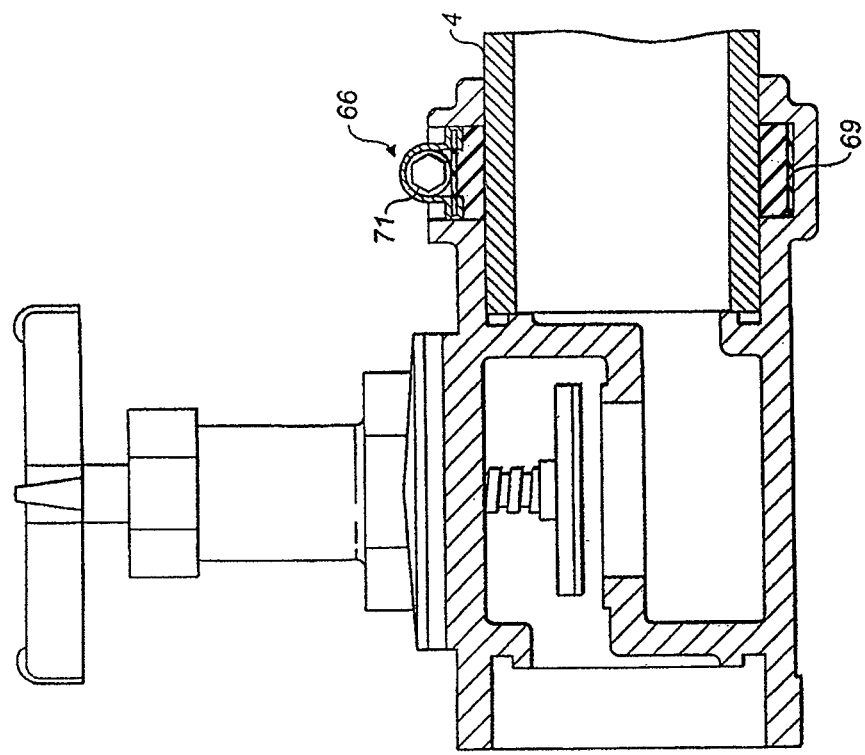
FIG. 12 shows a partial longitudinal cross-section of a pipe joint in accordance with a sixth embodiment of the present invention.

In FIGS. 12 and 13, an alternative form of the sealing assembly 66 is shown. The sealing assembly 66 includes a snap ring 69 and a separate clamp 71. The force exerted by the sealing assembly 66 may be such that, for certain applications, the connection ring 30 is not required. Therefore, the connection ring 30 is not shown in FIGS. 12 and 13. It can be seen that neither the end of the pipe length 4 nor the connection end 18 of the pipe joint 2 are formed with respective grooves 10, 12 in this case should the pipe joint 2 be required for a high-strength application, the connection ring 30 could be re-introduced.

Figure 14:
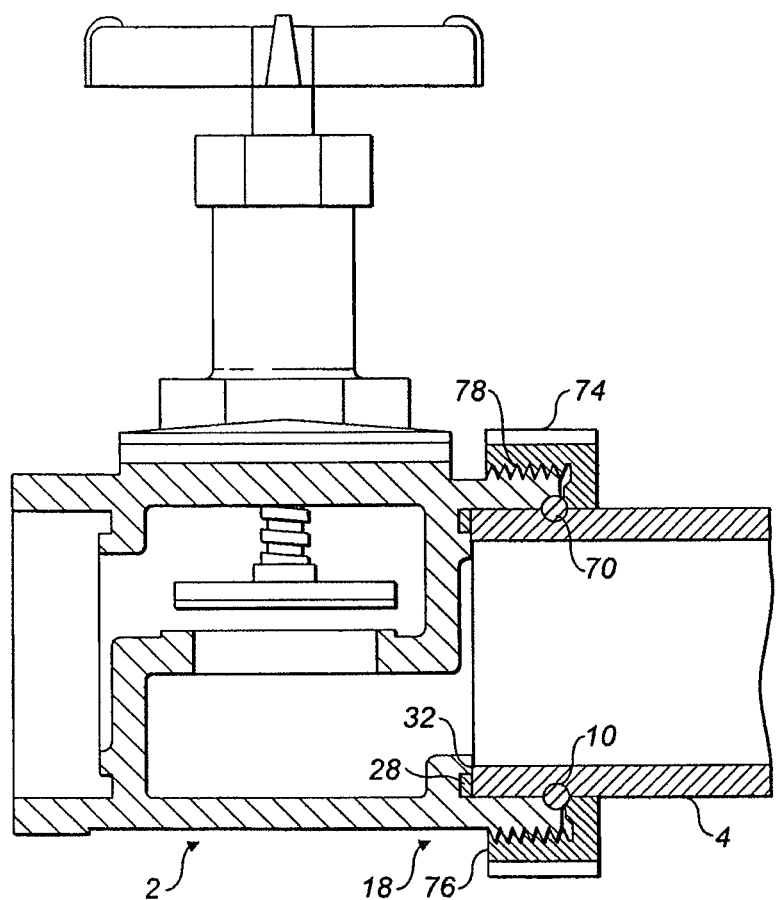
FIG. 14 shows a partial longitudinal cross-section of a pipe joint in accordance with a seventh embodiment of the present invention.

Referring now to FIG. 14, the pipe joint 2 may comprise a securing collar 74. The securing collar 74 is provided with a threaded inner surface 76 that is adapted to mate with a threaded outer surface 78 of the connection end 18 of the pipe joint 2. The connection ring 30 is replaced by a resilient split-ring 80 having an internal diameter slightly smaller than an outer diameter of the pipe length 4. This arrangement allows the split-ring 80 to be slipped over the end of the pipe length 4 and locked into position in the groove 10 formed in the end of the pipe length 4. The end of the pipe length 4 is joined to the connection end 18 by "running-up" the securing collar 74 onto the threads 78 on the connection end 18. Once the securing collar 74 has been run-up far enough, the securing collar 74 will abut the split-ring 80 and will drive the end of the pipe length 4 into the recess until the end face 32 is seated against the annular seal 28. The securing collar 74 may be run-up using a C spanner or by any other suitable method known in the art.

It will be appreciated that a connection ring 30 could also be used with the securing collar 74 described in the embodiment of FIG. 14.

Referring now to FIGS. 15 and 16, a further embodiment of the pipe joint 2 is shown. The pipe joint of FIGS. 15 and 16 includes a split ring 80, a screw collar 82, and a tapered split ring 84. The screw collar 82 is provided with an outer threaded surface 86 that is adapted to mate with a threaded inner surface 88 of the connection end 18 of the pipe joint 2. In this embodiment of the pipe joint 2, the connection ring 30 has been replaced by the split tapered ring 84, which may comprise a body 90 formed of a resilient material, such as nylon. The split ring 80 may be integral with the tapered split ring 84; alternatively the split ring 80 and the tapered split ring 84 could be two discrete components.

In use, the arrangement of the pipe joint 2 shown in FIG. 15, would be assembled by first slipping the screw collar 82 over the end of the pipe 4. The split ring 80 would then be positioned so as to be located in a groove 10 of the pipe 4. The tapered split ring 84 would be slipped over the end of the pipe 4 so that a groove 92 located on an inner surface of the tapered split ring 84 is located over the split ring 80. The end of the pipe 4 would then be positioned within the recess 8 of the pipe joint 2 until the outer surface of the tapered split ring 84 abutted the inner surface of the recess 8. The end of the pipe length 4 would be joined to the connection end 18 by "running-up" the screw collar 82 onto the threads 88 of the connection end 18 using a C spanner which would engage notches 94 of the screw collar 82.

In FIG. 15, it can be seen that the pipe joint 2 abuts the seal 28 to form a fluid-tight seal. However, the pipe joint 2 may also include a seal 96 which is located between the interface of the tapered split ring 74 and the screw collar 82. The seal 96 may be utilised when a pipe joint is used in hazardous environments in which two seals are required or where corrosive gases may exist outside the pipe; the seal 96 can be used to stop such gases from coming into contact with either or both of the split ring 80 and the tapered split ring 84.

It will be appreciated that, for certain applications, the use of a nylon tapered ring 84 may provide the required fluid-tight seal for the pipe joint 2, thus dispensing with the need for the seal 28 or the seal 96 in the pipe joint 2.

In yet a further alternative embodiment of the present invention, the grooves 10, 12 may align when there is a small gap between the end face 32 of the pipe length 4 and the annular abutment 16, so as to allow for thermal expansion of the pipe length 4. In this embodiment if the pipe joint requires a seal, a sealing arrangement as shown in any of FIG. 5, 7, 10 or 12 may be incorporated into the pipe joint.

The above embodiments are to be understood as illustrative examples of the invention. Further embodiments of the invention are envisaged. For example, the connection ring 30 and sealing ring 52 illustrated in FIG. 5 may be interchanged, such that the sealing ring 52 is closer to the annular abutment 16. Such an arrangement would stop the connection ring 30 from being exposed to the fluid passing through the system, which in certain circumstances may be corrosive to the connection ring 30.

As described with reference to FIG. 3 above, the annular seal 28 does not have to be located in a recess.

The bolt 60 shown in FIG. 8 may be replaced with studding that extends from the flange 58 and the collar 62 may be secured by the use of nuts and washers.

A length of pipe may be provided with a connection end 18 and a groove 12 at one of its ends resulting in this end of the length of pipe being flared; at its opposite end the end of the pipe may be arranged to have an annular groove 10 on its external surface as illustrated in the Figures; in this embodiment a coupler would not have to be used to join two lengths of similar pipe together. Instead, the groove 10 at one end of one pipe section would mate with the groove 12 at the end of an adjacent pipe section.

Although it has been stated above that the connection ring 30 may be coated with Teflon® to aid with insertion and extraction of the connector from the groove 10, 12, it would also be possible to coat or impregnate the connection ring 30 with another plastics material to lubricate the connection ring.

The channel 34 may be provided with a thread onto which a nipple may be attached to allow a suitable lubricant such as grease, copper slip or the like to be pumped into grooves 10, 12.

Although a substantially cylindrical pipe joint 2 and pipe length 4 have been described above, the pipe joint 2 and pipe length 4 could be of any configuration. Similarly, the grooves 10, 12 and the connection ring 30 can take any form. For example, the grooves 10, 12 can be arranged to form a quadrilateral cross-sectional annular space, such as a square, in which a correspondingly shaped connection ring 30 can be located to connect the pipe length to the pipe joint. A square-shaped annular space may mean that, in use, the connection between the pipe joint and the pipe length withstand greater forces than a connection created when the grooves 10, 12 and the connection ring 30 have a circular cross-section. However, providing a square-shaped annulus may, in certain applications, cause stress fractures at the corners of the groove 10 in the pipe length. Therefore, it may be better for the shape of the groove 10 in the pipe length to be semi-circular in those applications.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A pipe joint comprising a conduit and a connector having a substantially circular cross-section, said conduit formed with at least one connection end, said connection end comprising:
    a wall defining a receiving recess for receiving an end of a length of pipe;
    a groove formed to a depth in an internal surface of the wall of the receiving recess; and
    a channel communicating between the groove and an external surface of the connection end;
    said connector being formed from a length of material which is seatable within the groove via the channel and which is wider than the depth of the groove so that when seated within the groove the connector extends into the receiving recess;
    and wherein the length of material of the connector has a first end insertable into the channel and a second end, remote from the first end; and
    the pipe joint further comprising a retainer removably threaded into the channel, the retainer permitting insertion or removal of the connector into the channel when removed and for retaining the connector in the channel by engaging the second end when secured in the channel; and
    wherein said length of material of said connector is a length of multi-stranded metal wire.

2. A pipe joint according to claim 1 wherein the material of the connector is resilient.

3. A pipe joint according to claim 1 wherein said connector has a lubricating coating.

4. A pipe joint according to claim 1 wherein a lubricating channel is provided in fluid connection with said groove.

5. A pipe joint according to claim 1 wherein said groove is an annular groove and wherein the connector extends substantially all the way around the groove.

6. A pipe joint according to claim 1, including a valve arrangement coupled to the conduit.

7. A pipe joint according to claim 1, wherein the end connection includes a pipe end face abutment extending inwardly of the internal surface of the wall, and wherein the pipe end face abutment is an annular abutment and the abutment forms a seat for an annular seal.

8. A pipe joint according to claim 1 in combination with the length of pipe, wherein the pipe joint is connected to the length of pipe, and wherein the pipe is formed with a groove on its external surface corresponding to the groove in the internal surface of the wall of the connection end, and the connector, when seated in the groove in the internal surface of the wall of the connection end, extends into the groove in the pipe.

9. A method of connecting a pipe to a pipe joint of claim 1, said method comprising the steps of:
    inserting an end of the length of pipe into the receiving recess;
    aligning a groove on the external surface of the pipe with the groove in the internal surface of the wall of the receiving recess;
    inserting the connector, via the channel, into a space formed by the aligned grooves; and
    then securing the retainer in the channel.

10. A pipe joint according to claim 1, wherein the retainer closes the channel to prevent unwanted matter entering the channel.

11. A pipe joint according to claim 1, wherein the retainer has a nipple portion and a through passage for enabling a lubricant or a sealant to be inserted into the channel and groove via the through passage.

12. A pipe joint according to claim 1, wherein the second end of the connector is coupled to the retainer by a ferrule fixed to the second end of the connector and the ferrule is axially captured in the retainer but freely rotatable relative to the retainer.

13. A pipe joint according to claim 12 wherein the ferrule is swaged onto the connector.

14. A pipe joint according to claim 1, wherein said at least one connection end includes a second like connection end for connecting to a second length of pipe.

15. A pipe joint and a length of pipe and an annular seal, the pipe joint including a conduit and a connector having a substantially circular cross-section, said conduit formed with at least one connection end, said connection end comprising:
    a wall defining a receiving recess for receiving an end of a length of pipe;
    a groove formed to a depth in an internal surface of the wall of the receiving recess; and
    a channel communicating between the groove and an external surface of the connection end;
    said connector being formed from a length of material which is seatable within the groove via the channel and which is wider than the depth of the groove so that when seated within the groove the connector extends into the receiving recess;
    and wherein the length of material of the connector has a first end insertable into the channel and a second end, remote from the first end; and
    the pipe joint further comprising a retainer removably threaded into the channel, the retainer permitting insertion or removal of the connector into the channel when removed and for retaining the connector in the channel by engaging the second end when secured in the channel;

wherein the pipe joint is connected to the length of pipe, and wherein the pipe is formed with a groove on its external surface corresponding to the groove in the internal surface of the wall of the connection end, and the connector, when seated in the groove in the internal surface of the wall of the connection end, extends into the groove in the pipe;

wherein the end connection includes a pipe end face abutment extending inwardly of the internal surface of the wall, wherein the pipe end face abutment is an annular abutment and the annular abutment forms a seat for the annular seal, and wherein the annular seal is adapted to seal between the annular abutment and an end face at the end of the length of pipe.

* * * * *